March 31, 1970 R. STRUB 3,503,206
CLOSED CYCLE GAS TURBINE POWER PLANT AND
METHOD OF STARTING THE SAME
Filed July 29, 1968 2 Sheets-Sheet 1

Inventor:
Rene Strub
BY Pennie, Edmonds,
Morton, Taylor and Adams
ATTORNEYS

# United States Patent Office 3,503,206
Patented Mar. 31, 1970

3,503,206
CLOSED CYCLE GAS TURBINE POWER PLANT
AND METHOD OF STARTING THE SAME
René Strub, Winterthur, Switzerland, assignor to Sulzer Brothers Limited, Winterthur, Switzerland, a Swiss company
Filed July 29, 1968, Ser. No. 748,365
Claims priority, application Switzerland, July 27, 1967, 10,675/67
Int. Cl. F01k 25/00, 3/18
U.S. Cl. 60—36
7 Claims

ABSTRACT OF THE DISCLOSURE

There is disclosed a method of starting up a closed cycle $CO_2$ gas turbine power plant including high and low pressure expansion and compression stages on separate shafts. According to the method of the invention the high pressure shaft is set into rotation by an auxiliary motor while the low pressure turbine and at least one stage of compression lower than the highest are bypassed until the temperature of the working substance at the inlet to the low pressure turbine rises to a suitable level. Apparatus for practice of the method is also disclosed.

---

The present invention pertains to a method of starting up a gas turbine which employs $CO_2$ as the working substance and in which a portion of the working substance is branched off from the main flow path upstream of the high pressure compressor, to be condensed and then raised in pressure and returned to the circuit. The plant includes at least two compressor stages on separate shafts with intermediate cooling, and two expansion stages (one on each of those shafts), the heat being applied to the working substance from an external source such as a nuclear reactor, at least in part in course of its passage between those expansion stages. Regenerators are provided for heating the working substance prior to expansion. The useful load is taken from the low pressure shaft.

It has been heretofore proposed to operate $CO_2$ gas turbine plants by withdrawing a part of the gas from the main flow path at high pressure and thereafter cooling and liquefying it. In such a process the cooled working substance is desirably restored to a higher pressure by means of a pump, whereupon it is heated and then returned to the main flow path. This method serves to assimilate the $CO_2$ circuit to a Carnot cycle.

It is also known to transform into electric energy the heat evolved in a nuclear reactor by means of a gas turbine plant having a closed circuit and employing as working substance $CO_2$ which operates as a coolant in the reactor. Delivery of heat to the $CO_2$ cycle from the reactor is advantageously effected in the intermediate range or pressures of the plant, where the $CO_2$ has already been partially expanded in a high pressure turbine. This mode of operation has the advantage that the conduits which lead the $CO_2$ through the reactor may be designed for low or moderate pressures.

It is an object of the present invention to facilitate the starting up of a $CO_2$ gas turbine plant in which the $SO_2$ is partially condensed at high pressures. Such plants have a large flow rate of working substance per unit time, especially when nuclear reactors are employed as heat sources therein. This makes the structure of the plant extensive, making the start-up difficult in view of the mechanical and thermal inertia of the large masses involved. In addition, difficulties may be experienced in cooling parts of the system which are cut out of the $CO_2$ cycle on start-up but which rotate nevertheless.

In accordance with the invention, there is put into operation initially on start up only a part of the complete $CO_2$ cycle, namely a so-called starting circuit which includes the condensing part of the system. In this starting circuit, $CO_2$ which has been condensed is brought to increased pressure by means of a pump and is then expanded in the high pressure expansion stage of the plant. Thereafter, this part of the working substance is heated by means of the heat source, e.g. a reactor, and is then returned to the condenser over a shortened path which includes at least one regenerator, but which bypasses the low pressure portion of the system including at least one stage of compression thereof. When the $CO_2$ has reached a suitable temperature at a point upstream of the low pressure expansion stage, the short-circuiting connections are removed and the low pressure expansion stage is brought into operation.

The invention is of course not limited to the use of a nuclear reactor as heat source. Other and conventional types of heat sources can be employed for this purpose. Neither is the invention limited by a requirement that the external heat be applied to the working substance exclusively and only upstream of the low pressure expansion stage.

Before it undergoes expansion in the high pressure turbine, the working substance circulating in the starting circuit is raised in temperature by the heat stored in one or more regenerators, in the event that sufficient heat is so stored. If the heat content of the regenerators is insufficient to effect the necessary heating of the gas before its expansion in the high pressure turbine during start-up, the gas can be supplementary heated in accordance with the invention during start up, preferably at a location immediately upstream of the high pressure expansion stage.

In order to cool the compressor on the high pressure turbine shaft during the start-up process, it is possible in accordance with the invention to connect that compressor in a separate short flow cycle including a cooler.

According to a further feature of the method of the invention, during at least part of the start-up process a stream of gas is passed through the high pressure compressor on the high pressure turbine shaft in parallel to the stream of working substance passing through the condenser and is injected into the starting circuit so as to pass through the high pressure expansion stage.

The invention also provides apparatus for the practice of the method hereinabove briefly described. In such apparatus there is provided a starting motor coupled to the high pressure shaft and bypass lines for cutting out the low pressure expansion stage and for connecting the low pressure outlets of the regenerator unit or units to the condenser.

Bypass lines may be provided to connect the compressors on the high pressure shaft into a short, separate closed cycle and including a cooler.

According to another feature of the invention, a supplementary heat source may be provided immediately upstream of the high pressure expansion stage. This is particularly advantageous when the system is operated in conjunction with a nuclear reactor whose heat is extracted only at intermediate pressures in order that the reactor be not traversed by high pressure lines.

BRIEF DESCRIPTION OF THE DRAWINGS

The invention will now be further described in terms of two non-limitative exemplary embodiments and by reference to the accompanying drawings in which.

Figure 1:
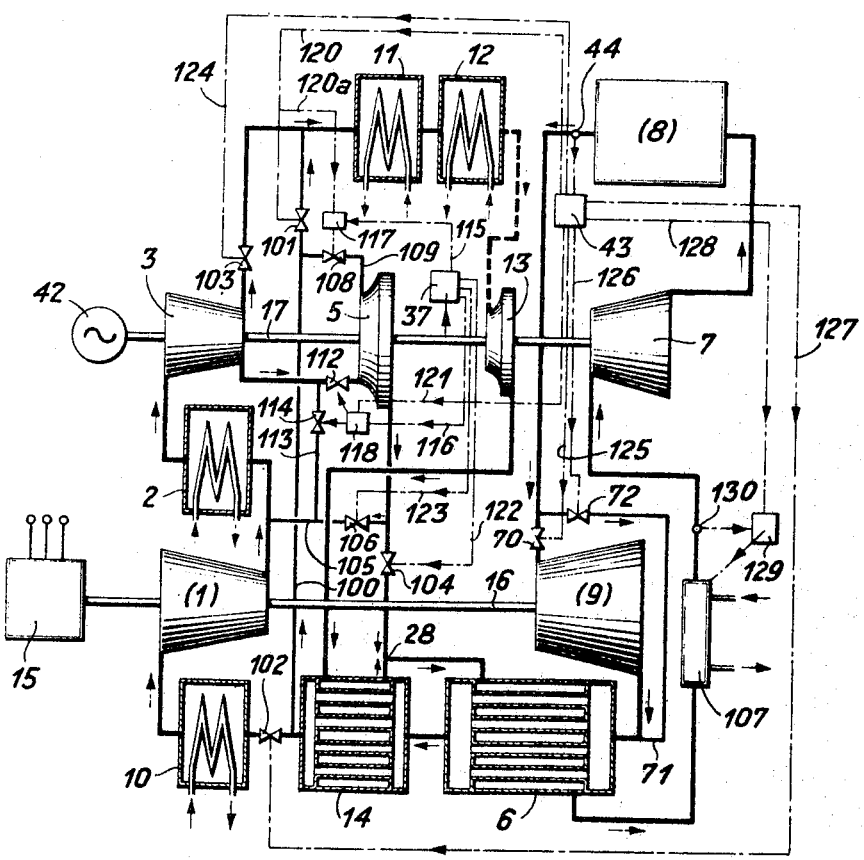
FIG. 1 is a diagram of one plant according to the invention for practice of the method thereof, showing in particular the necessary control elements.

In the drawing "lines" or pipes (i.e. conduits) carrying gaseous $CO_2$ are shown as single lines on the paper. Conduits carrying condensate are shown as dashed lines, while signal conduits are shown as dot-dash lines.

DESCRIPTION OF PREFERRED EMBODIMENTS

Referring to FIG. 1, there will be first described the flow circuit under normal operation.

The low pressure compressor 1 is mounted on the low pressure shaft 16 with the electric generator 15 which provides the useful output from the plant. Compressor 1 draws cold expanded low pressure $CO_2$ gas from a heat exchanger or recooler 10 and raises it to an intermediate pressure. After passage through an intercooler 2, the gas then passes into the intermedite pressure compressor 3 which is driven from the high pressure turbine 7 by means of shaft 17. There are additionally mounted on this shaft a high pressure compressor 5 and a condensate pump 13.

At the exit from the intermediate compressor 3, the gas is divided into two approximately equal streams. One of these half streams flows through the precooler 11 and condenser 12 to the pump 13 where it is brought to the highest pressure in the system. The circuit may be so laid out that the condensate emerging from the condenser 12 passes up through its critical pressure on compression in the pump 13 and is delivered to a heat exchanger or regenerator 14 through which it flows to the right in the drawing and where it is heated by waste heat from expanded working substance (i.e. $CO_2$) flowing to the left, before being reunited at point 28 with the other half stream.

This other half stream passes from the compressor 3 directly into the high pressure compressor 5 where it is brought to its final pressure and delivered to the junction point 28.

From the point 28 the complete gas stream passes to the right through the regenerator 6 where it is heated by expanded $CO_2$ on its way to cooler 10. The complete gas stream so heated is then delivered from regenerator 6 to the high pressure turbine 7 for partial expansion therein.

In the heat source for the plant, located downstream of turbine 7 in the cyclical flow path of the $CO_2$ working substance and illustratively shown in FIG. 1 as comprising a nuclear reactor 8, the $CO_2$ undergoes heating before being expanded to its initial pressure in the low pressure turbine 9. It is this expansion in the turbine 9 which develops the useful output power of the plant. In its passage through the regenerators 6 and 14 and through the cooler 10, the expanded gas arriving from turbine 9 is restored to its initial condition upstream of the low pressure compressor 1. In the cooler 10 and also in the intercooler 2, precooler 11 and condenser 12, heat is rejected to the exterior of the system by means of a coolant such as water.

Figure 2:
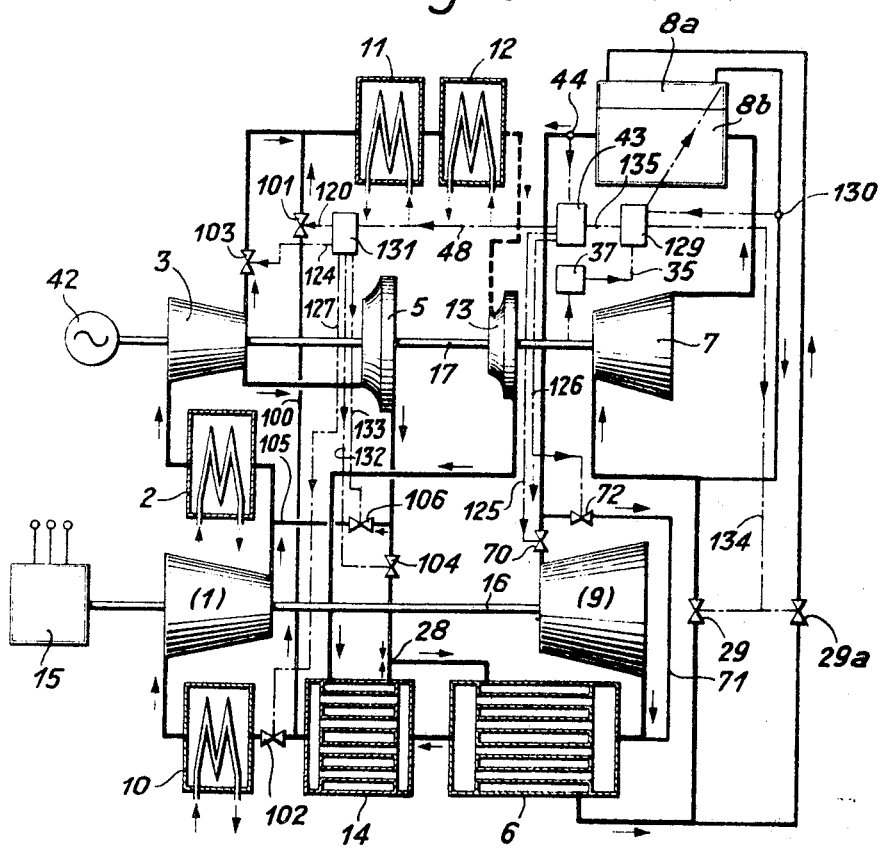
FIG. 2 is a diagram of another plant according the the invention showing modified arrangements for control.

As illustrated in FIG. 2 however the heat supply unit, e.g. the reactor 8, can be subdivided into a high pressure portion 8a and a low pressure portion 8b so that the supply of heat to the working substance can occur in part upstream of the high pressure turbine 7. To this end at least part of the gas already raised to final pressure, i.e. at least part of the complete gas flow reestablished at point 28, is supplied to the high pressure reactor portion 8a for heating, after passing through the regenerator 6 and before flowing into the high pressure turbine 7. Suitable flow control devices 29 and 29a, which may take the form of hand controlled valves, are provided to govern the passage of this stream through the high pressure portion 8a of the heat source and may be set to cause the complete gas flow to pass through the high pressure half 8a of heat source. It is however possible to deliver heat to a portion only of the stream of compressed gas by passing only a part of that stream through heat source 8a. In that event, the control devices 29 and 29a may be constructed as regulators, e.g. continuously adjustable valves with actuators thereon, operating oppositely in dependence on temperature or pressure measuring devices at the outlet from the heat source 8a, as will be further described hereinafter.

For practice of the method of the invention the systems of the two figures each include a starting motor 42 coupled to the high pressure shaft 17, and a bypass line 100 having a controllable throttling element or valve 101 therein. By means of this valve 101 and the control valves 102 and 103, a portion of the basic circuit including the low pressure compressor 1 and the intermediate compressor 3 can be removed from the flow path of the working substance during start-up. For bypass of the low pressure turbine 9 on start-up, the plants of FIGS. 1 and 2 include a control valve 70 in the main flow path upstream of this turbine and a variable orifice valve 72 in a bypass line 71 around the low pressure turbine. Additionally, both embodiments include a flow control device 104 at the outlet of the compressor 5 and a connecting line 105 having a control valve 106 necessary for establishing a short-circuit flow path through the intermediate compressor 3, high pressure compressor 5 and intercooler 2. The short-circuit flow path through the cooler 2, compressor 3 and compressor 5 (via valve 112) serves to cool those compressors on the shaft 17 during start-up.

In FIG. 1 the supply of heat occurs during normal operation, exclusively in the reactor 8, operating as a reheater downstream of the high pressure turbine 7. FIG. 1 however includes a supplementary heat source 107 by means of which according to necessity additional heat can be introduced to the system. The term starting circuit or start-up circuit is used to denote a circuit for the working substance by means of which the plant is brought to operating temperature and pressure conditions. It may include less than all elements of the complete system, and may vary in make-up over the course of the start-up procedure. This start-up circuit, which will in any event include the heat source of the system, is to be distinguished from a protective flow circuit such as that including cooler 2 and compressors 3 and 5, which is established during start-up by suitable manipulation of valves 104, 106 and 112 precisely because those compressors have been removed from the main flow circuit.

According to a further feature of the method of the invention, the high pressure compressor 5 can be brought into the starting circuit at a specified time during start-up. To this end a line 109 contains a valve 108 and connects the line 100 of FIG. 1 with the input to the compressor 5.

The protective short-circuit flow stream then includes only the unloaded intermediate pressure compressor 3. To establish the closed cycle flow path therefor, a bypass 113 is provided, having a valve 114 and connected between line 105 and the output from compressor 3 upstream of valve 112. Closing of valve 112 and opening of valve 114 thus establishes a protective flow circuit for compressor 3 which includes only that compressor and cooler 2.

In both embodiments a speed measuring device or tachometer 37 on high pressure shaft 17 and a temperature measuring device 44 for measurement of the exit temperature of gas from the reactor 8 and an associated regulator 43 constitute the measurement and control elements necessary for practice of the method of the invention.

In the plant of FIG. 1, signal lines 115 and 116 lead from the tachometer 37 to separate follow-up regulators 117 and 118 whose functions will be described presently. The follow-up regulator 117, which receives additionally a signal from the temperature controller 43 via signal lines 120 and 120a, operates on valve 108. Regulator 118 on the other hand, operates on the valves or throttling elements 112 and 114. It likewise receives a supplementary signal from the temperature controller 43 via line 121.

The valves 104 and 106 in FIG. 1 are connected by signal channels 122 and 123 with the tachometer 37. Valves 104 and 106 thus include actuators responsive to the signals transmitted to them over lines 122 and 123.

Output signals from the temperature-responsive controller 43 pass additionally via line 124 to the valve 103 and via lines 125 and 126 to the valves 70 and 72 upstream of the low pressure turbine 9. Valves 70 and 72, like valves 104 and 106, and the similarly shown valves such as 101, 102, 103, 108, 112 and 114, include signal-responsive actuators for shifting the setting of those valves. Controller 43 is, moreover, connected via signal line 127 with the valve 102 upstream of the low pressure compressor 1. Lastly, signal line 128 leads from a further output of the controller 43 to an additional follow-up controller 129 which receives a second input from the temperature measuring device 130 disposed in the main flow path for working substance upstream of the high pressure turbine 7.

The follow-up controller 129 delivers an output signal to a supplementary heat source 107 and thereby controls the supply of supplementary heat to the upstream end of high pressure turbine 7 during start-up. If the heat source 107 is not provided, the elements 128 and 130 may be omitted from the embodiment of FIG. 1. The device 107 may be a heat exchanger, with device 129 operating on valves which control the flow of a hot fluid through the primary side thereof for delivery of heat to the $CO_2$ flowing through the secondary side of the exchanger on its way from regenerator 6 to turbine 7.

The start-up procedure of the invention as applied to the embodiment of FIG. 1 occupies three phases. Initially, the valves 102, 103, 104 and 70 of the main flow circuit and the valves 108 and 114 in the bypass lines 109 and 113 are all closed. On the other hand, valves 72 and 101 are opened.

At the start of the first phase, shaft 17 of the high pressure turbine is set into rotation by means of motor 42 and the $CO_2$ flows first from condenser 12 through the pump 13, through the high pressure sides of regenerators 14 and 6 (i.e. to the right therethrough), through turbine 7, reactor 8, line 71, the low pressure sides of the regenerators 6 and 14 (to the left therethrough) and through the line 100 back to the condenser 12. This effects the heating up of the working substance in the reactor 8. If the heat content of regenerators 6 and 14 is insufficient to raise the gas circulating in this initial starting circuit to the temperature desired therefor upstream of the high pressure turbine 7, additional heat is supplied from the source 107 by action of the temperature measuring device 130 on the controller 129. The shaft 17 picks up speed from the driving motor 42, which is aided by action of the turbine 7.

In order to cool the idling compressors 3 and 5, gas may be caused to circulate therein and in the cooler 2 disposed between them. For this purpose valves 106 and 112 are opened. Valve 114 however remains closed. The short-circuit thus established passes from the cooler 2 through the compressors 3 and 5 and the line 105 back to the cooler 2.

The second start-up phase begins when the shaft 17 reaches a specified speed of rotation. In the course of this second phase, the compressor 5 is brought into the start-up circuit. At the start of this second phase follow-up controller 117 opens valve 108 and controller 118 opens valve 114 and closes valve 112, all in response to signals from the tachometer 37. The result is that the cooling circuit will now include only the compressor 3 (the only one now idling), the line 113, a portion of the line 105 and the intercooler 2.

Valves 104 and 106 are then respectively opened and closed in response to signals arriving on the lines 122 and 123 so that during this second phase a portion of the gas passes out of line 100 through valve 108 for compression in the high pressure compressor 5. The gas so compressed passes to the point 28 where it joins the gas sent by pump 13 through the regenerator 14. Downstream of the junction point 28 (i.e. to the right thereof), the starting circuit described in conjunction with phase 1 remains unchanged in phase two, the gas being progressively further heated until the end of phase two by increased supply of heat from the reactor 8. Thus the gas pumped by pump 13 and that compressed in compressor 5 flows to the right through unit 6, then through exchanger 107, turbine 7, reactor 8 and valve 72 to pass then to the left through units 6 and 14 and up the line 100 where it divides into two parts, one going to units 11 and 12 and pump 13 and the other to compressor 5.

If during the second phase of start-up the temperature measured at 130 at the input to the high pressure turbine 7 is too high, the addition of heat from the source 107 can be reduced or terminated by operation of the controller 129.

When as measured at the point 44 the temperature of the gas emerging from the reactor 8 reaches a specified value, such as for example 400 C., there begins the third phase of the start-up procedure, in the course of which the plant undergoes transition to normal operating condition. To this end the following operations are undertaken, in dependence on the output signal of the temperature-responsive controller 43: Valves 101 and 108 are closed in response to signals on the lines 120 and 120a. The signal on the line 120a passes first to the controller 117, delivering thereto a signal which overrides that from the line 115 which by itself would call for an open condition of the valve. Consequently, valve 108 is closed.

The controller 117 and in similar fashion the controllers 118 and 129 are denoted follow-up regulators by reason of the supply thereto of signals from two soures.

An overriding signal on line 121 operates on follow-up controler 118 in similar fashion to open valve 112 and close valve 114. By means of separate signals on lines 124 and 127 the temperature-responsive controller 43 opens valves 102 and 103 whereas the signal on line 125 opens valve 70 and the signal on 126 closes the valve 72.

If the supply of heat from the source 107 has not already been cut off in response to a signal from the temperature measuring device 130, it will be cut off by operation of the follow-up controller 129 in response to a signal from the controller 43, which can also override the signal from the temperature measuring device 130.

The control system of FIG. 2 is modified and in some respects simplified by comparison with that of FIG. 1. In the system of FIG. 2 phase two is omitted and along therewith the control elements necessary therefor, phase two pertaining to a control of the high pressure compressor 5 during start-up. Consequently, in FIG. 2 this compressor remains short-circuited during the entire start-up process.

Moreover, in FIG. 2, the output signal line 48 from the temperature-responsive controller 43 passes to a branching point 131 where it branches into lines 120, 124, 127, 132 and 133. Lines 132 and 133 lead to the valves 104 and 106, whose setting is adjusted in this embodiment as in that of FIG. 1 by the temperature of the gases emerging from the reactor 8. As in the embodiment of FIG. 1, signal lines 125 and 126 also lead from the controller 43 to the valves 70 and 72 respectively.

In FIG. 2 the supplementary external source of heat 107 of FIG. 1 is replaced by a portion 8a of the reactor 8. By means of this portion 8a, gas at high pressure can be heated either during start-up only or during normal operations as well. To this end a portion of the high pressure gas is led through the reactor portion 8a by operation of the valves 29 and 29a, these valves being controlled by the follow-up controller 129. During start-up this controller receives a signal from the tachometer 37 via line 35. In addition, the follow-up controller 129 receives a further input from the temperature measuring device 130 which is disposed in the $CO_2$ inlet line leading to the reactor portion 8a. Device 130 can be either a temperature or a pressure measuring device, as will hereinafter be more fully described.

At the beginning of the start-up process, the individual throttling and valve elements are in the same positions as the corresponding ones in the apparatus of FIG. 1. Thus in FIG. 2 the truncated main flow path cycle on start-up passes to the left through units 6 and 14, up the line 100, through units 11 and 12, pump 13, to the right through units 14 and 6 to turbine 7 (with part of the $CO_2$ flowing first throuhg reactor portion 8a), through reactor portion 8b, and through valve 72 back to the starting point. A cooling circuit is provided for the idling compressors 3 and 5 through valve 106 and cooler 2, valve 103 being closed.

The working substance in the start-up circuit is raised in temperature in the same manner as in FIG. 1, optionally with insertion into circuit of the reactor portion 8a, the rotating compressors 3 and 5 being again disposed in a short-circuit which includes the cooler 2. Heating of the high pressure gas in the reactor portion 8a is begun in response to a signal from the tachometer 37, passed to the follow-up controller 129, when the high pressure shaft 17 reaches a specified speed. Valves 29 and 29a are initially opened and closed respectively. Controller 129 then operates on them via signal line 134, so that a part of the working substance is caused by regulator 129 to flow through the reactor portion 8a and is there heated before being expanded in the high pressure turbine 7.

The devices 29 and 29a can take the form of simple open or closed valves or of oppositely adjustable control elements. In the latter case, the supply of heat into the high pressure portion of the working substance circuit can be either diminished or shut off in response to a signal from the temperature measuring device 130 as soon as the temperature upstream of the turbine 7 has reached the desired level. For this purpose the controller 129 responds to a signal supplied to it from the temperature measuring device 130. Simultaneously the activity of the reactor portion 8a is correspondingly diminished or shut off by operation of the controller 129 in response to the same signal from the temperature measuring device 130. The signal from device 130 overides a second input to the controller 129 coming from the tachometer 37.

When the temperature of the gas emerging from the low pressure portion 8b of the reactor reaches a specified level, as measured at the temperature measuring device 44, the system undergoes transition to its normal operating configuration by means of operations already described, carried out by signals passed over lines 120, 124, 125, 126 and 127 in response to action of the controller 43. That is, valve 101 closes, valve 103 opens, valve 70 opens, valve 72 closes, and valve 102 opens. At the same time, the valve 106 is closed in response to a signal on line 133 and the valve 104 is opened in response to a signal received over line 132. The positions taken up by the valves in response to action of the controller 43 result in the setting of the plant into condition for normal operation, start-up of the low pressure shaft 16 occurring in both embodiments by action of low pressure turbine 9.

If the devices 29 and 29a take the form of valves adjustable in opposite senses, it is possible to permit a portion of the working substance to pass through the reactor portion 8a for heating even during normal operation. Control of the temperature of the reactor portion 8a and of the amount of $CO_2$ working substance flowing through it are then effected in dependence on the signals from the tempertaure measuring device 130. In order for, however, heat to be withdrawn from the reactor portion 8a during normal operation it is of course necessary that this portion of the reactor be designed to withstand the highest pressures encountered in the system.

In order to protect the reactor from excessive pressures it is possible in such case to construct the measuring device 130 as a pressure-responsive instrument, limiting the pressure of the gas at the input to the reactor portion 8a and thereby the heating of high pressure gas and the amount thereof passing through the reactor part 8a.

When the temperature measured at 44 rises to a specified level, which may be different from and preferably higher than that at which occur the above-described operations for transfer to normal operation, it is also possible to permit the regulator 43 to operate on the controller 129 via line 135 and thereby to limit the amount of working substance allowed to flow through the reactor portion 8a and consequently to limit the heating effect therein, reducing or cutting off the heat input to the plant.

While the invention has been described hereinabove in terms of a number of presently preferred embodiments thereof and in terms of a number of modes of the presently preferred practice of the method thereof, the invention itself is not limited thereto, but rather comprehends all modifications of and departures from the embodiments and practice hereinabove described properly falling within the spirit and scope of the appended claims.

I claim:

1. A method of starting-up a power plant in which $CO_2$ flows in a closed cycle successively through a high pressure expansion stage, a heater, a low pressure expansion stage, a regenerator for delivery of heat therein, a low pressure compression stage coupled to the low pressure expansion stage and to a useful output load, through an intercooler, an intermediate pressure compressor coupled to the high pressure expansion stage and to a high pressure compressor, and thence in parallel partial streams one of which passes through the high pressure compressor and the other of which passes through a condenser and a pump for recombination with said one partial stream prior to flow through said regenerator for absorption of heat therein and delivery to said high pressure expansion stage, which method comprises the steps of closing off flow through the low pressure compressor, and bypassing the low pressure expansion stage and at least one of said high and intermediate pressure compressors until the temperature of the $CO_2$ upstream of the low pressure expansion stage has reached a specified level.

2. A method according to claim 1 including the further step of applying heat to the $CO_2$ prior to flow through the high pressure expansion stage.

3. A method according to claim 1 including the step of connecting at least one of said bypassed high and intermediate pressure compressors into a separate closed cycle flow path including a cooler.

4. A method according to claim 1 including the step of connecting the high pressure compressor in parallel with the condenser and pump.

5. A closed cycle gas turbine power plant comprising a series-connected high pressure expansion stage, heater, low pressure expansion stage, regenerator, low pressure compressor coupled to the low pressure expansion stage, intercooler, and intermediate pressure compressor stage coupled to the high pressure expansion stage, said plant further comprising a condenser and a pump connected in series between the intermediate pressure compressor and high pressure expansion stage, a high pressure compressor coupled to the high pressure expansion stage and connected between the intermediate pressure compressor and high pressure expansion stage, said plant further comprising means to bypass the low pressure expansion stage and means to bypass at least one of said low pressure intermediate and high pressure compressors.

6. A power plant according to claim 5 including means to connect the intermediate pressure and high pressure compressors into a separate closed circuit for flow of working substance therethrough, said separate closed circuit including a cooler.

7. A power plant according to claim 5 including means to connect the high pressure compressor in parallel with the condenser and pump between said last-named bypass means and high pressure expansion stage.

References Cited

UNITED STATES PATENTS

| | | | |
|---|---|---|---|
| 2,203,731 | 6/1940 | Keller. | |
| 2,318,905 | 5/1943 | Traupel | 60—39.25 XR |
| 2,627,717 | 2/1953 | Waller | 60—39.25 XR |
| 2,697,492 | 12/1954 | Destival | 60—39.25 XR |
| 3,205,664 | 9/1965 | Nettel | 60—70 |
| 3,321,930 | 5/1967 | La Fleur. | |

MARTIN P. SCHWADRON, Primary Examiner

ROBERT R. BUNEVICH, Assistant Examiner

U.S. Cl. X.R.

60—59